Oct. 21, 1941.  E. A. ARP  2,260,158

MACHINE FOR BORING BEARING SHELLS

Filed June 3, 1940  2 Sheets-Sheet 1

INVENTOR
EWALD A. ARP
BY
G. H. Braddock
ATTORNEY

Oct. 21, 1941.        E. A. ARP        2,260,158
MACHINE FOR BORING BEARING SHELLS
Filed June 3, 1940        2 Sheets-Sheet 2
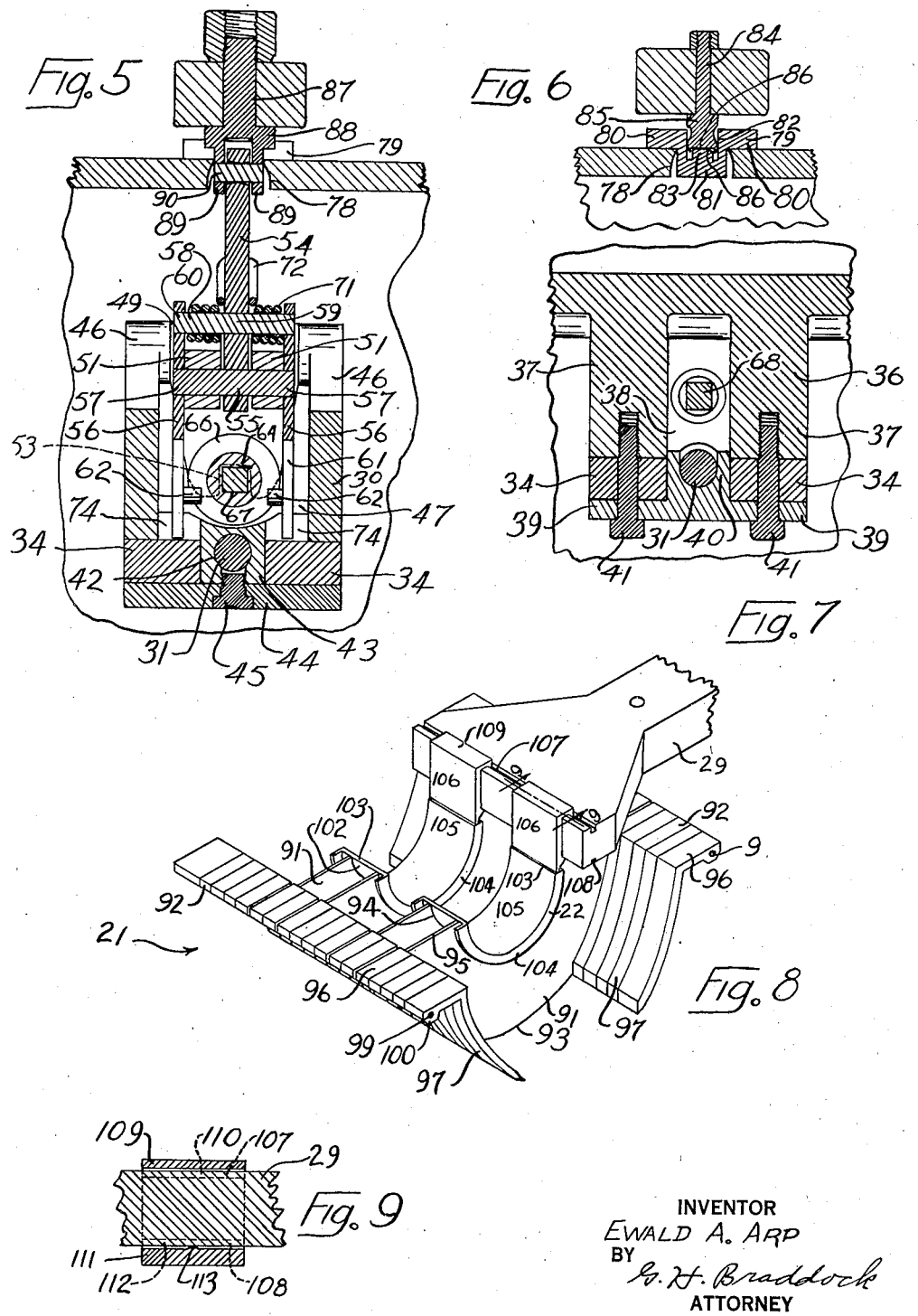
INVENTOR
EWALD A. ARP
BY
G. H. Braddock
ATTORNEY Patented Oct. 21, 1941

2,260,158

UNITED STATES PATENT OFFICE 2,260,158

MACHINE FOR BORING BEARING SHELLS

Ewald A. Arp, Minneapolis, Minn., assignor to Tobin-Arp Manufacturing Company, Minneapolis, Minn., a copartnership consisting of Wilbert J. Tobin, Ewald A. Arp, and Henry S. Kedney Application June 3, 1940, Serial No. 338,567

29 Claims. (Cl. 77—3)

This invention relates to a machine for boring bearing members, and has more explicit relation to a machine which has been designed and constructed to be more especially useful to the purpose of boring bearing shells.

An object of the invention is to provide a machine for boring bearing members or shells which will be of novel and improved construction and will receive bearing members or shells to be bored, and support or retain the bearing members or shells while being bored, in novel and improved manner.

A further object is to provide a machine for boring bearing members or shells wherein will be incorporated various improved features and characteristics of construction novel both as individual entities of the machine and in combination with each other.

A further object is to provide a machine for boring bearing members or shells which will incorporate novel and improved devices for centering and alining with respect to each other a bearing member or shell, or bearing members of shells, to be bored and a boring bar with appropriate tool, or tools, for operating upon said bearing member or shell, or said bearing members or shells.

A further object is to provide in the machine novel and improved devices appurtenant to main devices of said machine and adapted to the purpose, together with the main devices, of making the machine simple, durable and inexpensive, and, at the same time, capable of performing its intended functions in entirely efficient and satisfactory manner.

And a further object is to provide a novel and improved machine of the present character which will include provision for adjustments, or readily performed simple alterations, of the machine adapted to render it capable of receiving and supporting or retaining in boring position bearing members or shells to be bored which are of considerably different sizes and shapes.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawings forming a part of this specification,

Fig. 5 is a detail sectional view, taken on line 5—5 in Fig. 1;

Fig. 6 is a detail sectional view, taken on line 6—6 in Fig. 1;

Fig. 7 is a detail sectional view, taken on line 7—7 in Fig. 1;

Figure 1:
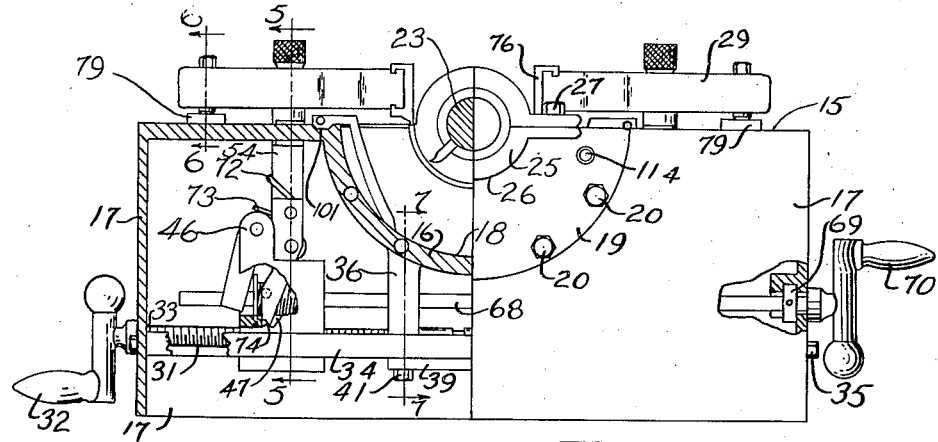
Fig. 1 is an end elevational view, with parts removed, parts broken away and parts in section, of a machine for boring bearing members or shells in which the features and characteristics of the invention are incorporated, disclosing clamping members of the machine in operative positions.

Fig. 8 is a perspective view detailing parts of the machine as said parts would appear when seen from a position somewhat above the machine, disclosing two bearing members or shells to be bored situated in boring position and each secured down at one of its ends by a clamping member and ready to be secured down at its other end by a second clamping member; and Fig. 9 is a detail sectional view, taken on line 9—9 in Fig. 8.

With respect to the drawings and the numerals of reference thereon, a main frame of the machine is of generally rectilinear configuration and consists of a horizontal top wall 15 including a downwardly disposed part-cylinder member 16 thereof extending transversely of the frame at its midlength and for its full width, and vertical side and end walls 17 extending downwardly from the side and end margins of said top wall. The vertical walls 17 are adapted to be secured to or upon any suitable anchoring structure for the machine. The part-cylinder member 16 is as disclosed substantially a half-cylinder, and provides an upwardly facing arcuate surface 18, above said part-cylinder member 16, extending the full length of said part-cylinder-member. The lower portions of the opposite ends of the part-cylinder member 16 are closed by annular cover plates 19 removably secured, as at 20, upon said opposite ends of said part-cylinder member.

The part-cylinder member 16 and its upwardly facing arcuate surface 18 are for the purpose of supporting or retaining devices, represented generally at 21, which, in turn, are for the purpose of supporting or retaining bearing members or shells, such as indicated at 22, in properly centered and alined relation to a boring bar 23 of the machine. A motor 24 for rotating the boring bar 23 may be of any ordinary or preferred construction and may be supported in any suitable and convenient manner, and said boring bar may be caused to move longitudinally, or reciprocate, in any way which may be selected. In the disclosure as made, the boring bar 23 is secured directly to a driven shaft of the motor 24, in alining relation to said shaft. Said boring bar is mounted, at the elevation of the top wall 15 of the machine in the illustrated embodiment of the machine, in bearings 25 which are suitably and conveniently supported, as at 26, upon the annular cover plates 19, at the inner circular margins of said cover plates, and are concentric with the upwardly facing arcuate surface 18. Each bearing 25 desirably is split, and bolts 27 secure upper and lower portions of said bearings, respectively, in fixed relation to each other. The boring bar 23 is adapted to support or include, in customary or preferred fashion, an operating tool, or operating tools, 28 for accomplishing a boring operation upon a bearing member or shell, or bearing members or shells, to be bored.

The machine incorporates spaced apart, oppositely disposed clamping members, each denoted 29, situated above the top wall 15 at its mid-width and mounted to be capable of having movement longitudinally of the machine toward and away from each other and toward and away from the boring bar 23. There is a clamping member 29 at each side of the boring bar 23 in spaced relation to said boring bar and at elevation slightly above the top wall 15. In addition to being mounted to be capable of having movement longitudinally of the machine toward and away from each other and toward and away from the boring bar 23, said clamping members 29 are also mounted to be capable of having movement to engaging or operative relation with a bearing member or shell, or bearing members or shells, supported or retained in the machine in position to be bored and to non-engaging or inoperative and withdrawn or clearing relation, as when bearing members or shells are to be placed into boring position in the machine or removed.

The clamping members 29 are adapted to be operated in unison, or together, both when adjusted toward each other and consequently toward the boring bar 23 and away from each other and away from said boring bar, as well as when moved into engaging or operative relation to a bearing member or shell, or bearing members or shells, and to non-engaging or inoperative and withdrawn or clearing relation required to permit the performance of the operation of placing bearing members or shells in and removing them from the machine.

Each clamping member 29 is connected, in a manner to be explained, with an adjustable carriage 30, and movement of said clamping members 29 longitudinally of the machine is accomplished in response to, or with, adjustment of the carriages 30 longitudinally of said machine.

There is a carriage 30 beneath each clamping member 29, in spaced relation to the clamping member. One of the carriages 30 is disclosed in Fig. 1. The other one is of course at the right side of the machine, obscured from view by the near side wall 17 of the frame in said Fig. 1. The carriages 30 and their appurtenances are substantially duplicates, except one of the carriages with its appurtenances is "right" and the other carriage with its appurtenances is "left," as will be understood.

An adjusting screw or externally threaded rod 31 is for the purpose of causing the carriages 30 to be operated in unison, or together, toward and away from each other and so that each carriage moves the same distance, or to the same extent, when said adjusting screw or externally threaded rod 31 is rotated, as by a handle or crank 32. The end portion of the adjusting screw or externally threaded rod 31 adjacent the handle or crank 32 is rotatably mounted, as at 33, in an end wall 17 of the frame of the machine, and said screw or rod is suitably fixed against endwise movement. Spaced apart, parallel, horizontal beams 34, at either side of and in spaced relation to said screw or rod 31, extend longitudinally of the frame and are made rigid, as by screw bolts 35, with its opposite end walls. Anchoring elements 36, one of which is shown in Figs. 1 and 7, spaced from each other in direction longitudinally of the machine, are rigid or integral with lower portions of the part-cylinder member 16 and extend vertically downwardly from the lower surface of said part-cylinder member. Each anchoring element 36 includes a pair of vertical arms 37 spaced from each other in direction transversely of the machine to provide clearance spaces 38 between said vertical arms and directly above the adjusting screw or externally threaded rod 31. The clearance space 38 of each anchoring element 36 has width equal to the distance between the longitudinally extending beams 34, and the lower ends of the vertical arms 37 of said anchoring elements and the upper surfaces of said longitudinally extending beams, respectively, are in engaging relation to each other. A bearing support includes longitudinally extending side portions 39 thereof fitted up against the lower surfaces of the longitudinally extending beams 34 and a middle portion, or middle portions, 40 thereof, disposed between said longitudinally extending beams below the clearance spaces 38, providing a bearing, or bearings, for an intermediate portion, or intermediate portions, of the adjusting screw or externally threaded rod 31. The longitudinally extending side portions 39 of the bearing support are secured in rigid, contiguous relation to the longitudinally extending beams 34, and said beams are secured in rigid, contiguous relation to the spaced apart anchoring elements 36, by screw bolts 41 which are situated in the opposite ends of said longitudinally extending side portions of the bearing support, pass through the beams 34 and enter the lower ends of the spaced apart arms 37 of said anchoring elements.

Each carriage 30 includes a threaded opening 42 in its lower portion through which the screw or rod 31 passes and with which said screw or rod is threadably engaged. The screw or rod 31 has right threads for one of the carriages 30 and left threads for the other carriage, so that said carriages will be moved toward each other in response to rotation of the screw or rod in one direction and away from each other in response to rotation of the screw or rod in opposite direction. As will be clear from Figs. 1 and 5, each carriage 30 rests upon and is slidable along the upper surfaces of the longitudinally extending beams 34 and includes a flange 43 extending downwardly from the midwidth of its lower portion and longitudinally of the machine situated snugly and slidably between said beams 34. A retainer plate 44 for insuring that each carriage 30 will be maintained in its intended position relatively to the longitudinally extending beams 34 is held up against the lower surfaces of said longitudinally extending beams and against the lower surface of the corresponding flange 43 by a small threaded stud 45. Each retainer plate 44 moves with its corresponding carriage 30 as a unit when the carriages are caused to be operated or slid longitudinally of the machine.

As disclosed, each carriage 30 includes or supports mechanism for connecting the carriage with the corresponding clamping member 29 both to the purpose that the clamping members can be moved in unison, or together, longitudinally of the machine with longitudinal adjustment of the carriages and to the purpose that said clamping members can be operated in unison, or together, into engaging or operative relation to bearing members or shells situated in the machine to be bored and to non-engaging or inoperative and withdrawn or clearing relation.

In the disclosure as made, each carriage 30 is a casting the body of which integrally supports upstanding standards or posts 46 spaced from each other in direction transversely of the machine and situated at or adjacent to the outer side of said casting. That is, the spaced apart, upstanding standards or posts 46 are at the side of the corresponding casting which faces the adjacent end wall. The body of each carriage or casting 30 is hollowed out to provide a concavity 47 in said body between and below and at the inner side of said spaced apart upstanding standards or posts 46. That is, the concavity 47 of each carriage or casting 30 is disposed between and below the corresponding standards or posts 46 and extends inwardly of said standards or posts and has its inner portion defined by an upstanding flange 48 of the carriage or casting extending transversely of the machine and situated inwardly of and in spaced relation to the standards or posts 46. The transversely extending flange 48 of each carriage or casting 30 is situated at elevation somewhat above the adjusting screw or rod 31 and below the elevation of said standards or posts 46.

A bell crank lever 49 has an intermediate portion thereof pivotally supported, as by a cross pin 50, upon and between upper portions of the standards or posts 46 of each carriage or casting 30. Desirably, each bell crank lever 49 has width to span the distance between the spaced apart standards or posts 46 upon which pivotally supported, as shown in Fig. 5, so that said standards or posts will situate the bell crank levers against the possibility of sidewise movement in the machine. A shorter, inwardly and substantially horizontally extending portion of each bell crank lever 49 is bifurcated to provide spaced apart, parallel legs 51 of said inwardly extending portion situated at the inner sides of the corresponding standards or posts 46 directly above the inner portion of the corresponding concavity 47, and a longer, downwardly and substantially vertically extending portion or leg 52 of each bell crank lever 49 is situated adjacent to and between the corresponding standards or posts and in the outer portion of the corresponding concavity 47. The lower end of the downwardly extending portion or leg 52 of each bell crank lever 49 is provided with a clearance slot 53.

A connecting link 54 has its lower end situated between and pivotally supported, as by a cross pin 55, upon the inner or free ends of the spaced apart legs 51 of each bell crank lever 49, and the connecting links 54 extend substantially vertically upwardly from the carriages or castings 30. Each connecting link 54 is desirably of width to approximately span the distance between the spaced apart legs 51 by which supported. The opposite end portions of each cross pin 55 extend outwardly a slight distance beyond the spaced apart legs 51 by which supported, and spaced apart, substantially vertical levers 56, one at either side of the legs 51 of the shorter portion of each bell crank lever 49 adjacent to or contiguous with side surfaces of said shorter portions, have upper parts thereof pivotally supported, as at 57, upon said opposite end portions of the corresponding cross pin 55. A cross pin 58, fixed, as at 59, in a lower portion of each connecting link 54 and having its opposite ends fixed, as at 60, in the upper ends of the corresponding vertical levers 56 secures said connecting link 54 and said levers 56 to each other for pivotal movement as a unit upon the corresponding cross pin 55 in the instance of the operating mechanism of each carriage or casting 30 of the machine.

The lower portions 61 of the substantially vertical levers 56 of each operating mechanism extend downwardly into opposite side portions of the corresponding concavity 47, at location inwardly of and spaced from the longer, downwardly extending portion or leg 52 of the corresponding bell crank lever 49, and each lower portion 61 includes an inwardly extending lug 62 near its lower end. That is, the lugs 62 upon the lower portions 61 of each set of vertical levers 56 are arranged directly opposite each other in the corresponding concavity 47 at the inner sides of said levers 56.

The transverse flange 48 of each carriage or casting 30 includes a threaded opening 63 situated a trifle above the adjusting screw or rod 31 and disposed parallel to said screw or rod and longitudinally of the machine. A longitudinally adjustable actuating nut 64 situated in each opening 63 includes an externally threaded surface 65 thereof engaged with the internally threaded surface of the opening and a collar 66 thereof situated in the concavity 47 of the corresponding carriage or casting 30 between the longer, downwardly extending portion or leg 52 of the corresponding bell crank lever 49 and the lugs 62 near the lower ends of the corresponding vertical levers 56. The external threads 65 upon the different actuating nuts 64, respectively, are right and left, so that when said nuts are rotated in one direction they will move toward each other and in opposite direction they will move apart.

Each actuating nut 64 is provided with an angular passageway 67 extending longitudinally through the nut from end to end thereof, and a squared shaft 68 for simultaneously rotating both actuating nuts extends longitudinally of the machine and snugly and slidably through the angular passageways 67 of both of said actuating nuts. The squared shaft 68 is suitably and conveniently mounted, as at 69, upon an end wall of the frame of the machine, and fixedly carries an operating handle or crank 70. Said squared shaft 68 is adapted to be rotated by the handle or crank 70 and is fixed in the machine against longitudinal movement. The slots 53 in the lower ends of the longer, downwardly extending portions or legs 52 of the bell crank levers 49 provide clearance for passage of the squared shaft 68. See Fig. 5.

In the instance of the operating mechanism included or supported by each carriage or casting 30, the lower portions 61 of the corresponding substantially vertical levers 56 and the longer downwardly extending portion or leg 52 of the corresponding bell crank lever 49 are disposed in the corresponding concavity 47 to be capable of having swinging movement in direction longitudinally of the machine to the extent required to the accomplishment of the intended functions of each operating mechanism. Stated otherwise, the concavities 47 of the carriages or castings 30 are of sufficient dimensions to permit requisite swinging movement of the lower portions 61 and the portions or legs 52 in said concavities.

A tension coil spring 71 upon each cross pin 58, between the upper ends of the corresponding vertical levers 56 and the lower portion of the corresponding connecting link 54, includes a length or portion 72 thereof engaged against an outer surface of said corresponding connecting link and a different length or portion 73 thereof engaged against an upper surface of the corresponding bell crank lever 49 at location above the corresponding cross pin 50 for causing the lugs 62 upon the lower portions 61 of the corresponding vertical levers 56 and the longer, downwardly extending portion or leg 52 of the corresponding bell crank lever 49, respectively, to be resiliently urged into engaging relation with opposed surfaces of the collar 66 upon the corresponding actuating nut 64. Inward swinging movement of each portion or leg 52 is limited by the corresponding collar 66, and outward movement of said portions or legs 52 is limited by the clamping members 29 when fastened down. Inward swinging movement of the lower portions 61 of the levers 56 of each set is controlled by the corresponding collar 66 against which said lower portions 61 are resiliently urged outwardly by the corresponding coil spring 71, and outward swinging movement of the lower portions 61 of the vertical levers 56 is limited by stops 74, one for each lever 56 of each set of levers, including a pair of spaced apart stops 74, clearly disclosed in Figs. 1 and 5, at an outer lower portion of each concavity 47, below, or clear of, the corresponding lugs 62. The construction and arrangement are such that the longer, downwardly extending portions or legs 52 and the actuating nuts 64 can be moved further outwardly after outward movement of the lower portions 61 has been arrested by engagement of said lower portions with the stops 74, thus to cause the collars 66 to be removed from engaging relation with the lugs 62 upon said lower portions 61.

Each clamping member 29 is of generally elongated configuration and includes an enlarged clamping head 75 at its inner portion rigidly supporting a clamping jaw 76 at the inner end of the clamping member and extending transversely of the machine. The clamping members 29 are disposed longitudinally of the machine and the outer end portion 77 of each clamping member is of reduced width.

The top wall 15 of the frame of the machine is provided with a pair of elongated longitudinally extending slots 78, desirably situated at the midwidth of said top wall, including an elongated slot 78 directly below the midwidth of each clamping member 29.

A supporting member 79 for the outer reduced portion 77 of each clamping member 29 is slidably situated in the outer end portion of each longitudinally extending slot 78. More explicitly, each supporting member 79 includes side portions 80 thereof which rest upon and are slidable upon the top wall 15 at opposite sides of the corresponding longitudinal slot 78 and a body portion 81 thereof which is snugly and slidably situated in said slot. The body portion 81 of each supporting member 79 is provided in its upper surface with a pocket 82 including an upstanding stud or rounded protuberance 83 at its base. The outer end portion 77 of each clamping member 29 rigidly carries a vertical post 84 situated near the outer end of the clamping member, and each vertical post 84 includes a lower portion 85 thereof more or less loosely situated in the pocket 82 of the corresponding supporting member 79 and having a concave lower surface 86 resting upon the stud or rounded protuberance 83 at the base of said pocket in such manner that each clamping member 29 can have oscillatory or rocking movement in direction longitudinally of the machine while engaged with and resting upon its corresponding supporting member 79. The construction and arrangement are such that the supporting members 79 will be slid along the top wall 15 of the machine with the clamping members 29 when these are caused to be moved longitudinally. That is, the supporting members 79 constitute means for slidably supporting the clamping members 29 upon the top wall of the machine and for permitting said clamping members to be swung upwardly and downwardly and inwardly and outwardly.

The upper end of each connecting link 54 is situated in the longitudinal slot 78 which is adjacent the corresponding end of the machine and is suitably and conveniently pivotally connected to the clamping member which is directly above this mentioned longitudinal slot. More explicitly, each clamping member 29 rigidly carries an anchoring element 87 situated at about the center of the clamping member, substantially midway between the corresponding supporting member 79 and the transverse clamping jaw 76, and each anchoring element 87 includes a lower portion 88 thereof which is slidably guided in the corresponding longitudinal slot 78 both for movement longitudinally, inwardly and outwardly, of the machine and for swinging movement upwardly and downwardly. The lower portion 88 of each anchoring element 87 is bifurcated to provide spaced apart ears 89, and the upper end of the corresponding connecting link 54 is snugly situated between said spaced apart ears. A short cross pin 90, which extends transversely of the machine, has its central portion oscillatably fitted in an opening in the upper end portion of each connecting link 54 and its opposite ends fixed in the spaced apart ears 89 at either side of said upper end portion of the connecting link. Obviously, the construction and arrangement are such that the clamping members 29 are mounted upon the connecting links 54 to be movable with said connecting links, as well as upon the supporting members 79 to cause these to be movable with said clamping members.

Figure 2:
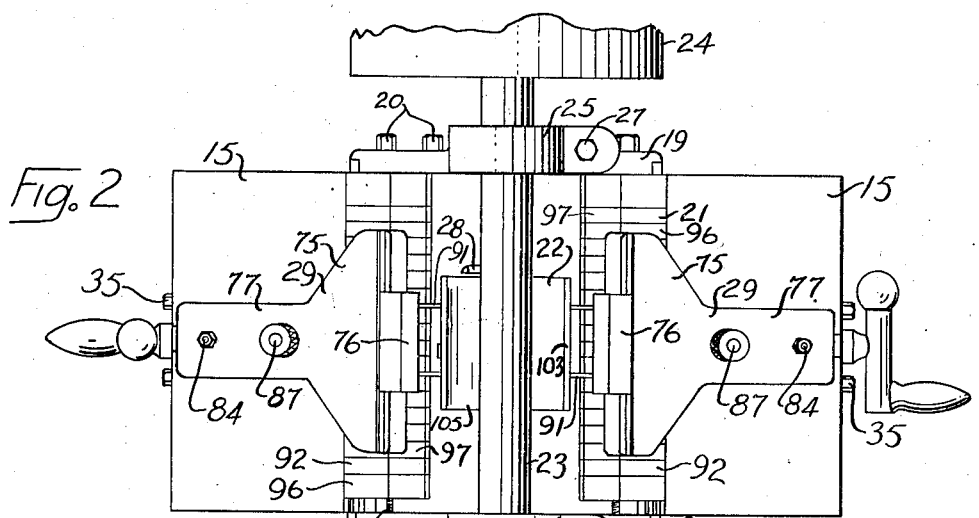
Fig. 2 is a top plan view of the machine disclosing the clamping members in inoperative and completely withdrawn positions.
Figures 3, 4:
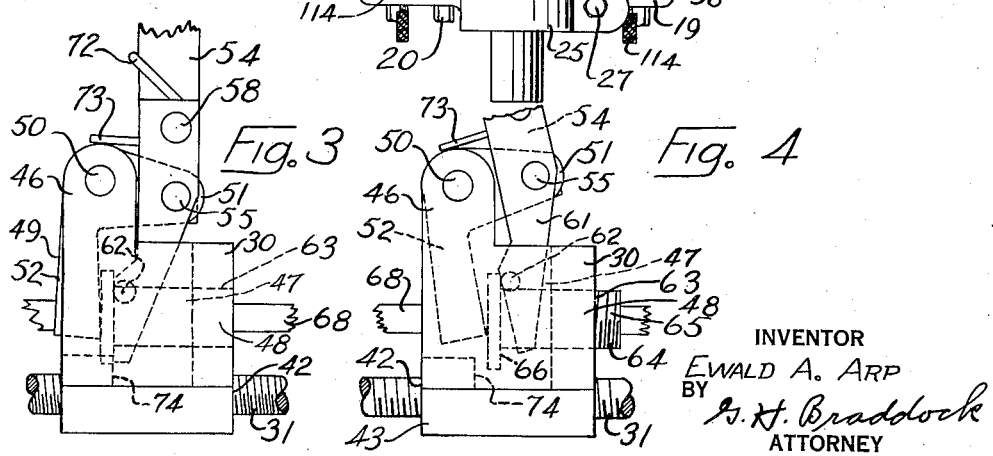
Fig. 3 is a side elevational view detailing mechanism of the machine for actuating one of the clamping members situated as when the corresponding clamping member is in elevated and non-withdrawn position.
Fig. 4 is a view corresponding generally with the disclosure of Fig. 3, but showing said mechanism situated as when the corresponding clamping member is in inoperative and completely withdrawn position.

The devices 21, hereinbefore mentioned, adapted to be supported or retained by the upwardly facing arcuate surface 18 provided by the part-cylinder member 16 and to in turn support or retain bearing members or shells, such as 22, in properly centered and alined relation to the boring bar 23, are clearly disclosed in Figs. 1, 2 and 8.

Speaking generally, said devices 21 include part-circular discs 91 of annular configuration mounted directly upon the upwardly facing arcuate surface 18, and spacing and retaining elements 92 for said part-circular annular discs.

More explicitly, each disc 91 is a flat, part-circular piece of rigid material, preferably metal, adapted to be disposed in right-angle relation to the axis of the part-cylinder member 16 and including an outer, larger circumferential margin or edge 93 of the disc adapted to rest squarely upon and against the upwardly facing arcuate surface 18 along substantially the whole of the arc of said surface. An inner, smaller circumferential margin or edge 94 of each disc 91, concentric to the outer, larger circumferential margin or edge 93 of the disc, is adapted to be situated in concentric and predeterminedly spaced relation to the boring bar 23 and its operating tool 28 when the outer, larger circumferential margin or edge 93 of the disc is supported upon said upwardly facing arcuate surface 18 to provide, together with the margin or edge 94 of an adjacent similar disc, a work support for a bearing member or shell, such as 22, to be bored. The upper margins or edges 95 of each disc 91, adjacent the ends of the inner, smaller circumferential margin or edge 94 of the disc, are desirably straight, and, in the disclosure as made, the upper margins or edges 95 of all of the discs 91 terminate, when said discs are supported and retained in the machine, in a single horizontal plane situated at elevation a trifle below the upper surfaces of the top wall of the machine.

Each spacing and retaining element 92 is constituted as a generally L-shape member including a shorter, straight arm 96 of the member adapted to rest upon the upper surface of the top wall 15 of the machine and a longer, downwardly and inwardly curved arm 97 of the member adapted to lie within the part-cylinder member 16 so that the lower end of said longer curved arm rests against a lower part of the upwardly facing arcuate surface 18. The spacing and retaining elements 92 are in alining relation to each other transversely of the machine and in perpendicular relation to the axis of the part-cylinder member 16 when applied to use. The shorter, straight arms 96 of said elements are adapted to be attached together in alining relation by a small rod 98 made to pass through alined openings 99 arranged widthwise in said arms 96 of all of the elements. The outer or free end portions of the short, straight arms 96 include downwardly protruding portions 100 thereof adapted to lie in grooves 101 extending transversely of the upper surfaces of the top wall 15 of the machine, including a groove 101 adjacent each side of and parallel with the part-cylinder member 16, when the spacing and retaining elements are in service.

Said spacing and retaining elements 92 may be of the same width or of unequal widths. In practice, each part-circular disc 91 will be situated between adjacent spacing and retaining elements 92 and fixed in their intended positions in the machine by a line or row of spacing and retaining elements at each side of the part-cylinder member 16 which, together with the part-circular discs themselves, will have overall dimension to solidly fill the space, or solidly span the distance, between one of the annular cover plates 19 and clamping screws 114 in the other annular cover plate. That is, the clamping screws 114 are adapted to be turned inwardly to confine the spacing and retaining elements 92 of the different lines or rows of spacing and retaining elements and the part-circular discs 91 between certain of said spacing and retaining elements in pressing engagement with each other so that said part-circular discs will be clamped by said elements and thus fixedly supported or retained in their intended positions in the machine.

As shown, the bearing members or shells 22 are of part-cylindrical, or semi-tubular, configuration, each including an outer part-cylinder or arcuate surface 102 adapted to be rested squarely upon the inner, smaller circumferential margins or edges 94 of spaced apart discs 91 with the opposite ends or edges 103 of said bearing members or shells disposed in a single horizontal plane. As shown, said ends or edges 103 terminate about in the plane of the upper margins or edges 95 of said discs 91. Index or stop means may be employed to the purpose of properly positioning bearing members or shells in the machine. Clearly, by suitably selected arrangement of the discs 91 and the spacing and retaining elements 92 relatively to each other, cooperating discs 91 can be situated at any preferred distance apart in the machine, so that the devices 21 can be employed to support or retain bearing members or shells to be bored which are of considerably different lengths. And, too, the arc of cooperating inner, smaller circumferential margins or edges 94 can be selectively greater or less, so that said devices 21 can be employed to support or retain bearing members or shells to be bored which are of considerably different diameters. Stated otherwise, the discs 91 as disclosed can be replaced by equivalent discs which have inner, smaller circumferential margins or edges 94 of either increased or decreased diameter, as may be selected. Also, the construction as illustrated and described includes provision for supporting and retaining in boring position in the machine bearing members or shells which have angular flanges, such as those denoted at 104 in Fig. 8, of greater or less width upon their opposite ends. In short, the devices 21 render the machine capable of receiving and supporting or retaining in boring position bearing members or shells to be bored which are of considerably different sizes and shapes. Cooperating margins or edges 94 will of course be of equal arc so that any bearing member or shell supported or retained in the machine will be disposed concentrically of the boring bar 23. The operating tool, or operating tools, such as 28, will be adjustable inwardly and outwardly of the boring bar so that a cut of any depth intended may be made upon the inner part-cylinder or arcuate surface 105 of a bearing member or shell positioned in the machine to be bored.

The transverse clamping jaws 76 are adapted to be forced down as in Fig. 1 against the opposite ends or edges 103 of a bearing member or shell, or bearing members or shells, to be bored to cause the bearing member or shell, or bearing members or shells, to be rigidly fastened or fixed in the machine while a boring operation is performed, and the clamping members 29 with their clamping jaws are adapted to be withdrawn to clearing relation as in Fig. 2 in order that bearing members or shells can be placed in and removed from the machine.

The adjusting screw or externally threaded rod 31 and its appurtenances are obviously for the purpose of situating the transversely extending clamping jaws 76 in vertical alinement with the upwardly facing opposite ends or edges 103 of a bearing member or shell, or bearing members or shells, to be fastened or fixed in the machine. Evidently, said opposite ends or edges 103 will be farther apart when a bearing member or shell to be bored is of greater arc and will be closer together when a bearing member or shell is of less arc. By rotational movement of said screw or rod 31 the clamping members 29 can be moved longitudinally of the machine to set the clamping jaws 76 at location to properly fasten down a bearing member or shell having a certain diameter, and, while said clamping jaws are so set, a series of bearing members or shells of said certain diameter can be successively bored. Of course, the connecting links 54, the vertical levers 56 and parts apurtenant to said mentioned links and levers will cause the clamping members 29 to be moved longitudinally of the machine, inwardly or outwardly, in response to, or with, longitudinal movement of the carriages or castings 30 caused by rotation of the screw or rod 31.

The squared shaft 68 and the actuating nuts 64 and parts appurtenant to said shaft and nuts are obviously manipulable to cause the transverse clamping jaws 76 to be forced down against bearing members or shells situated in the machine and to cause the clamping members 29 with their clamping jaws to be withdrawn to clearing relation independently of the positions of said clamping members along the length of the machine.

When the squared shaft 68 is rotated in direction to cause the actuating nuts 64, together with their collars 66, to be moved toward each other, inwardly of the machine, said collars 66 will cause the lugs 62 and the lower portions 61 of the vertical levers 56 which support said lugs to be swung inwardly. Inasmuch as the tension coil springs 71 retain the longer, downwardly extending portions or legs 52 of the bell crank levers 49 in resilient engagement with outer surfaces of the collars 66, said longer, downwardly extending portions or legs 52 will swing inwardly of the machine when said collars 66 are moved inwardly thus to cause the shorter, horizontal portions or legs 51 of said bell crank levers to be swung upwardly. Upward swinging movement of said shorter, horizontal portions or legs 51 will cause the vertical levers 56 and the connecting links 54 to be bodily elevated, by reason of the fact that said vertical levers and said links are pivotally supported upon the outer or free end portions of the shorter, horizontal legs 51, and inward movement of the lower portions 61 of the vertical levers 56 will cause the upper portions of said vertical levers and said connecting links to be swung outwardly, toward the opposite ends of the machine, simultaneously with upward bodily movement of the vertical levers and connecting links. Continued upward bodily movement and outward swinging movement of the connecting links 54 will evidently cause the clamping members 29 to be moved to their inoperative and completely withdrawn positions as in Fig. 2. It should be remarked that the tension coil springs 71 are of sufficient strength to resiliently hold the longer, downwardly extending portions or legs 52 of the bell crank levers 49 in resilient engagement with the adjacent surfaces of the collars 66 upon the actuating nuts 64 against the weight of the clamping members 29 tending to cause the shorter, horizontal portions or legs 51 of said bell crank levers to be moved downwardly and said longer, downwardly extending portions or legs 52 to become removed from said collars. When the squared shaft 68 is rotated in direction to cause the actuating nuts 64 and their collars 66 to be moved away from each other, outwardly of the machine, said collars will cause the longer, downwardly extending portions or legs 52 of the bell crank levers 49 to be swung outwardly and the shorter, horizontal portions or legs 51 of said bell crank levers to be swung downwardly. By reason of the resilient action exerted by the tension coil springs 71 the lower portions 61 of the vertical levers 56 will swing outwardly when said collars 66 are moved outwardly. Downward swinging movement of said shorter, horizontal portions or legs 51 will cause the vertical levers 56 and the connecting links 54 to be bodily depressed, and outward movement of the lower portions 61 of the vertical levers 56 will cause the upper portions of said vertical levers and the connecting links 54 to be swung inwardly, toward the center of the machine, simultaneously with downward bodily movement of the vertical levers and connecting links. Continued downward bodily movement and inward swinging movement of the connecting links 54 will evidently cause the clamping members 29 to be moved toward their positions of engagement of the transverse clamping jaws with bearing members or shells situated in the machine. The construction and arrangement are such that outward swinging movement of the lower portions 61 of the vertical levers 56, and, consequently, inward swinging movement of the connecting links 54, is arrested by engagement of said lower portions 61 with the stops 74 when the clamping members 29 are moved downwardly and inwardly to position situating their transverse clamping jaws 76 in slightly spaced vertical alinement with the opposite ends or edges, such as 103, of a bearing member or shell, or bearing members or shells, to be fastened down in the machine. The actual fastening down operation is accomplished by substantially vertical downward movement of the clamping jaws caused by further or additional outward swinging movement of the longer, downwardly extending portions or legs 52 of the bell crank levers 49, against the resilient action of the tension coil springs 71, which causes the shorter, horizontal portions or legs 51 of said bell crank levers to be swung further downwardly and the connecting links 54 to be forced or pulled down in substantially vertical direction. That is to say, the fastening down operation is accomplished by outward movement of the longer, downwardly extending portions of legs 52 caused by forced outward movement of the actuating nuts 64 and their collars 66 after outward movement of the lower portions 61 of the vertical levers 56 has been arrested. As disclosed, the clamping down operation is accomplished by downward swinging movement of the shorter, horizontal portions or legs 51 from approximately horizontal position to position somewhat below horizontal. Thus, said portions or legs 51 and the links 54 are given outward movement during the clamping down operation to cause the clamping jaws to grip the work with what may be termed a spreading apart action. When the clamping members 29 are in operative positions, said lower portions 61 of said vertical levers 56 are engaged against the stops 74 and in spaced relation to the collars 66, and said collars retain said longer, downwardly extending portions or legs 52 at their outermost positions, as the parts are disclosed in Fig. 1.

In Figs. 8 and 9 there is disclosed a modified type of clamping jaw 106 more especially useful when a plurality of bearing members or shells are to be fastened down by a plurality of clamping jaws on a single clamping head. The clamping head shown in Fig. 8 includes upper and lower, oppositely disposed, transverse slots 107 and 108 in the upper and lower surfaces, respectively, of its inner end portion, and the clamping jaws 106 are removably assembled with said clamping head. More explicitly, each clamping jaw 106 includes a body portion slidable over the inner end of the clamping head, an upper flange 109 having a downwardly extending rib 110 slidably mounted in the upper transverse slot 107, and a lower flange 111 having an upwardly extending rib 112 slidably mounted in the lower transverse slot 108. The lower flange 111 of each clamping jaw 106 includes an upwardly extending rounded boss 113 at the midlength of its upper surface engaged against the lower surface of the clamping head. The clamping jaws 106 are more or less loosely fitted to the clamping head of Figs. 8 and 9, and the rounded bosses 113 provide engaging surfaces between said clamping jaws and said clamping head about which the clamping jaws are adapted to have pivotal movement in direction longitudinally and transversely of the jaws in any instance where a clamping jaw would not otherwise be properly alined with the surface of a bearing member or shell which the jaw is intended to engage.

What is claimed is:

1. In a machine for boring bearing members, a boring bar with operating tool, a member providing a concave surface, spaced apart supports upon said surface for retaining a bearing member in concentric relation to said boring bar, means for detachably fastening said supports in fixed relation to said concave surface, and means for releasably fastening said bearing member in fixed relation to said supports.

2. In a machine for boring bearing shells, a boring bar with operating tool, a member providing a concave surface, spaced apart supports upon said surface including arcuate portions of said supports for retaining a bearing shell in concentric relation to said boring bar, means for detachably fastening said supports in fixed relation to said concave surface, and means for releasably fastening said bearing shell in fixed relation to said supports.

3. In a machine for boring bearing shells, a boring bar with operating tool, a member providing a concave surface, a support fixed relatively to said surface including an arcuate portion of the support spaced from the surface for retaining a bearing shell in concentric relation to said boring bar, and means for releasably fastening said bearing shell in fixed relation to said support.

4. In a machine for boring bearing shells of arcuate configuration, a boring bar with operating tool, a member providing a surface, spaced apart supports fixed relatively to said surface including an arcuate portion of each support spaced from said surface for retaining a bearing shell in concentric relation to said boring bar with a part-cylinder outer surface of said shell resting upon the arcuate portions of said supports and a part-cylinder inner surface of said shell disposed adjacent said boring bar, and means for releasably fastening said bearing shell in fixed relation to said supports.

5. In a machine for boring bearing shells of arcuate configuration, a boring bar with operating tool, a member providing a surface, spaced apart discs fixed relatively to said surface including an arcuate margin of each disc spaced from said surface for retaining a bearing shell in concentric relation to said boring bar with a part-cylinder outer surface of said bearing shell resting upon the arcuate margins of said spaced apart discs and a part-cylinder inner surface of said bearing shell disposed adjacent said boring bar, and means for releasably fastening said bearing shell against said arcuate margins of said discs.

6. In a machine for boring bearing shells of arcuate configuration, a boring bar with operating tool, a member providing a concave surface, spaced apart supports upon said surface including an arcuate portion of each support for retaining a bearing shell in concentric relation to said boring bar with a part-cylinder outer surface of said bearing shell resting upon the arcuate portions of said spaced apart supports and a part-cylinder inner surface of said bearing shell disposed adjacent said boring bar, means for detachably fastening said spaced apart supports in fixed relation to said concave surface, and means for releasably fastening said bearing shell against said arcuate portions of said spaced apart supports.

7. In a machine for boring bearing shells of arcuate configuration, a boring bar with operating tool, a member providing a concave surface, spaced apart discs upon said surface disposed perpendicularly to said boring bar and including an arcuate inner margin of each disc for retaining a bearing shell in concentric relation to said boring bar with a part-cylinder outer surface of said bearing shell resting upon the arcuate inner margins of said spaced apart discs and a part-cylinder inner surface of said bearing shell disposed adjacent said boring bar, means for detachably fastening said spaced apart discs in fixed relation to said concave surface, and means for releasably fastening said bearing shell against said arcuate margins of said spaced apart discs.

8. In a machine for boring bearing shells of arcuate configuration, a boring bar with operating tool, a member providing an arcuate surface, spaced apart supports disposed perpendicularly to said boring bar and including an arcuate outer portion of each support resting upon said arcuate surface and an arcuate inner portion of each support for retaining a bearing shell in concentric relation to said boring bar with a part-cylinder outer surface of said bearing shell resting upon the arcuate inner portions of said spaced apart supports and a part-cylinder inner surface of said bearing shell disposed adjacent said boring bar, means for fastening said spaced apart supports in fixed relation to said arcuate surface, and means for releasably fastening said bearing shell against said arcuate inner portions of said spaced apart supports.

9. In a machine for boring bearing shells of arcuate configuration, a boring bar with operating tool, a member providing an arcuate surface, spaced apart part-annular discs disposed perpendicularly to said boring bar and including an arcuate outer margin of each part-annular disc resting upon said arcuate surface and an arcuate inner margin of each part-annular disc for retaining a bearing shell in concentric relation to said boring bar with a part-cylinder outer surface of said bearing shell resting upon the arcuate inner margins of said spaced apart part-annular discs and a part-cylinder inner surface of said bearing shell disposed adjacent said boring bar, means for detachably fastening said spaced apart part-annular discs in fixed relation to said arcuate surface, and means for releasably fastening spaced apart portions of said bearing shell against said arcuate inner margins of said spaced apart part-annular discs.

10. In a machine for boring bearing shells of arcuate configuration, a boring bar with operating tool, a member providing a concave surface, spaced apart supports upon said surface including an arcuate portion of each support for retaining a bearing shell in concentric relation to said boring bar with a part-cylinder outer surface of said bearing shell resting upon the arcuate portions of said spaced apart supports and a part-cylinder inner surface of said bearing shell disposed adjacent said boring bar, spacing and retaining elements upon said member disposed longitudinally of said concave surface and at opposite sides of and between said spaced apart supports, means for releasably clamping said spacing and retaining elements against each other and against the spaced apart supports to fasten said supports in fixed relation to said concave surface and to each other, and means for releasably fastening said bearing shell against said arcuate portions of said spaced apart supports.

11. In a machine for boring bearing shells of arcuate configuration, a boring bar with operating tool, a member providing a concave surface, spaced apart part-annular metal pieces upon said surface disposed perpendicularly to said boring bar and including an arcuate inner portion of each part-annular metal piece for retaining a bearing shell in concentric relation to said boring bar with a part-cylinder outer surface of said bearing shell resting upon the arcuate inner margins of said spaced apart part-annular metal pieces and a part-cylinder inner surface of said bearing shell disposed adjacent said boring bar, a plurality of rows of separate spacing and retaining elements upon said member including a row of separate spacing and retaining elements disposed longitudinally of said concave surface at each of opposite sides thereof, each of said rows including spacing and retaining elements disposed at opposite sides of and between said spaced apart part-annular metal pieces, means for releasably clamping spacing and retaining elements of each row against each other and against the spaced apart part-annular metal pieces to fasten said spaced apart metal pieces in fixed relation to said concave surface and to each other, and means for releasably fastening said bearing shell against said arcuate margins of said spaced apart part-annular metal pieces.

12. In a machine for boring bearing shells of arcuate configuration, a boring bar with operating tool, a member providing an arcuate surface, spaced apart part-annular discs disposed perpendicularly to said boring bar and including an arcuate outer margin of each part-annular disc resting upon said arcuate surface and an arcuate inner margin of each part-annular disc for retaining a bearing shell in concentric relation to said boring bar with a part-cylinder outer surface of said bearing shell resting upon the arcuate inner margins of said spaced apart part-annular discs and a part-cylinder inner surface of said bearing shell disposed adjacent said boring bar, a plurality of rows of separate spacing and retaining elements upon said member including a row of separate spacing and retaining elements disposed longitudinally of said arcuate surface at each of opposite sides thereof, each of said rows including spacing and retaining elements disposed at opposite sides of and between said spaced apart part-annular discs, means for releasably clamping spacing and retaining elements of each row against each other and against the spaced apart part-annular discs to fasten said part-annular discs in fixed relation to said arcuate surface and to each other, and means for releasably fastening said bearing shell against said arcuate inner margins of said spaced apart part-annular discs.

13. In a machine for boring bearing members, a boring bar with operating tool, means for supporting a bearing member in concentric relation to said boring bar, a pair of clamping members each including a clamping jaw, means for moving said clamping members toward and away from each other to cause their clamping jaws to be set at predetermined relation to spaced apart portions of said bearing member, and means for simultaneously actuating said clamping members to cause their clamping jaws to be concurrently pressingly engaged with and released and withdrawn from said spaced apart portions of said bearing member.

14. In a machine for boring bearing members, a boring bar with operating tool, means for supporting a bearing member in concentric relation to said boring bar, a pair of clamping members each including a clamping jaw, means for moving said clamping members toward and away from each other to cause their clamping jaws to be set at predetermined relation to spaced apart portions of said bearing member, and means for simultaneously actuating said clamping members to cause their clamping jaws to be concurrently pressingly engaged with the spaced apart portions of the bearing member and simultaneously released from said spaced apart portions and withdrawn to clearing relation of said bearing member.

15. In a machine for boring bearing members, a boring bar with operating tool, means for supporting a bearing member in concentric relation to said boring bar, a pair of clamping members each including a clamping jaw, means for moving said clamping members toward and away from each other to cause their clamping jaws to be set at predetermined relation to spaced apart portions of said bearing member, an actuating nut for manipulating each clamping member, and a rotatable shaft for simultaneously manipulating said actuating nuts to cause the jaws of said clamping members to be concurrently pressingly engaged against said spaced apart portions of said bearing member with rotation of said shaft in one direction and to be concurrently released from said spaced apart portions and withdrawn from the bearing member with rotation of said shaft in opposite direction.

16. In a machine for boring bearing members, a boring bar with operating tool, means for supporting a bearing member in concentric relation to said boring bar, a pair of spaced apart clamping members each including a clamping jaw, a carriage for each clamping member, a lever and link device for supporting and manipulating each clamp member connecting the clamp member with its corresponding carriage, an actuating nut adjustably assembled with each carriage for manipulating the corresponding lever and link device, means including an adjustable rod for moving said carriages toward and away from each other to cause said clamping members and their clamping jaws to be set at predetermined relation to spaced apart portions of said bearing member, and a rotatably mounted shaft for simultaneously manipulating said actuating nuts to cause the jaws of said clamping members to be concurrently pressingly engaged against spaced apart portions of said bearing member with rotation of said shaft in one direction and to be concurrently released from said spaced apart portions and withdrawn from the bearing member with rotation of said shaft in opposite direction.

17. In a machine of the character described, means for supporting a member to be operated upon, a clamping member having a clamping jaw adapted to be fastened down against and released from said member and withdrawn from the location of the member, an adjustable carriage, a lever and link device for supporting and manipulating said clamping member connected between said carriage and clamping member, an actuating nut adjustably assembled with said carriage for manipulating said lever and link device, and means for manipulating said actuating nut, said lever and link device being adapted to cause the clamping jaw of said clamping member to be moved in a straight path toward and against said member when said actuating nut is caused to be moved in one direction and to be released from said member and withdrawn from the location of the member when said actuating nut is caused to be moved in a different direction.

18. In a machine of the character described, a clamping member, a clamping jaw, elements loosely mounting said clamping jaw upon said clamping member, and means between a surface of said clamping member and an intermediate portion of said clamping jaw providing a pivotal support for said clamping jaw against said clamping member.

19. In a machine for boring bearing members, a boring bar with operating tool, a member providing a surface, spaced apart supports upon said surface and alined with each other longitudinally of the surface adapted to be engaged by a bearing member for retaining the bearing member in alined relation with said surface longitudinally thereof and in concentric relation to said boring bar, and means for releasably fastening said supports in fixed relation to said surface.

20. In a machine for boring bearing members, a boring bar with operating tool, a member providing a concave surface, spaced apart supports upon said surface adapted to be engaged by a bearing member for retaining the bearing member in concentric relation to said boring bar, and means for detachably fastening said supports in fixed relation to each other and to said concave surface.

21. In a machine for boring bearing shells, a boring bar with operating tool, a member providing a concave surface, spaced apart supports upon said surface including arcuate portions of said supports adapted to be engaged by a bearing shell for retaining the bearing shell in concentric relation to said boring bar, and means for detachably fastening said supports in fixed relation to each other and to said concave surface.

22. In a machine for boring bearing shells of arcuate configuration, a boring bar with operating tool, a member providing a surface, spaced apart supports fixed relatively to said surface including an arcuate portion of each support spaced from said surface adapted to be engaged by a bearing shell for retaining the bearing shell in concentric relation to said boring bar, and means for detachably fastening said supports in fixed relation to said surface.

23. In a machine for boring bearing shells of arcuate configuration, a boring bar with operating tool, and spaced apart supporting elements fixed relatively to said boring bar including an arcuate portion of each supporting element adapted to be engaged by a bearing shell for retaining the bearing shell in concentric relation to the boring bar.

24. In a machine for boring bearing shells of arcuate configuration, a boring bar with operating tool, spaced apart supporting elements fixed relatively to said boring bar including an arcuate portion of each supporting element adapted to be engaged by a bearing shell for retaining the bearing shell in concentric relation to the boring bar, and means for detachably fastening said supporting elements in said machine.

25. In a machine for boring bearing shells of arcuate configuration, a boring bar with operating tool, spaced apart supporting elements fixed relatively to said boring bar including an arcuate portion of each supporting element adapted to be engaged by a bearing shell for retaining the bearing shell in concentric relation to the boring bar, means for detachably fastening said supporting elements in said machine, and means for releasably fastening said bearing shell against said arcuate portions of said spaced apart supporting elements.

26. In a machine for boring bearing shells of arcuate configuration, a boring bar with operating tool, spaced apart supporting elements fixed relatively to said boring bar including an arcuate portion of each supporting element adapted to be engaged by a bearing shell for retaining the bearing shell in concentric relation to the boring bar, means for detachably fastening said supporting elements in fixed relation to each other in said machine, and means for releasably fastening said bearing shell against said arcuate portions of said spaced apart supporting elements.

27. In a machine for boring bearing members, a boring bar with operating tool, means for supporting a bearing member in concentric relation to said boring bar, a pair of clamping members each including a clamping jaw, means for moving said clamping members toward and away from each other to cause their clamping jaws to be set at predetermined relation to spaced apart portions of said bearing member, and means for simultaneously actuating said clamping members to cause their clamping jaws to be moved at angular relation to the direction in which the clamping members are moved toward and away from each other and concurrently pressingly engaged with and released and withdrawn from said spaced apart portions of said bearing member.

28. In a machine for boring bearing members, a boring bar with operating tool, means for supporting a bearing member in concentric relation to said boring bar, a pair of clamping members each including a clamping jaw, means for moving said clamping members toward and away from each other to cause their clamping jaws to be set at predetermined relation to spaced apart portions of said bearing member, and means for simultaneously actuating said clamping members to cause their clamping jaws to be moved at angular relation to the direction in which the clamping members are moved toward and away from each other and concurrently pressingly engaged with the spaced apart portions of the bearing member and simultaneously released from said spaced apart portions and withdrawn to clearing relation of said bearing member.

29. In a machine for boring bearing members, a boring bar with operating tool, means for supporting a bearing member in concentric relation to said boring bar, a pair of clamping members each including a clamping jaw, means for moving said clamping members toward and away from each other to cause their clamping jaws to be set at predetermined relation to spaced apart portions of said bearing member, an actuating nut for manipulating each clamping member, and a rotatable shaft for manipulating said actuating nuts to cause the jaws of said clamping members to be moved at angular relation to the direction in which the clamping members are moved toward and away from each other and concurrently pressingly engaged against said spaced apart portions of said bearing member with rotation of said shaft in one direction and released from said spaced apart portions and withdrawn from the bearing member with rotation of said shaft in opposite direction.

EWALD A. ARP.